Dec. 12, 1933.  W. H. ROSE  1,939,612
LIQUID PERVIOUS CONTAINER ATTACHMENT
Filed June 9, 1933

INVENTOR
William H. Rose
BY
ATTORNEY

Patented Dec. 12, 1933

1,939,612

UNITED STATES PATENT OFFICE 1,939,612

LIQUID PERVIOUS CONTAINER ATTACHMENT

William H. Rose, Jersey City, N. J.

Application June 9, 1933. Serial No. 675,066

5 Claims. (Cl. 15—134)

My invention relates to liquid-pervious attachments for containers and refers particularly to devices of this character having a sponge rubber element.

Devices for the application of a liquid from within a container by means of water-absorbent, or porous, materials placed over an opening in the container are known, but the present employed devices possess objectionable features incident to the character of the water-absorbent, or porous, material employed and the inability to control the amount of liquid passing through said opening.

Among the materials employed for this purpose are natural sponges and felted materials.

Natural sponges soon disintegrate, fall apart, or become tender and easily torn and hence have no permanency of character. Further, because of their soft, easily compressible character, they cause a much wider surface of wetted effect than is frequently desirable when pressed upon a surface with sufficient force to squeeze out the contained liquid. As it is frequently advantageous to produce a narrow wetted surface, as in the sealing of envelopes, this characteristic of natural sponge is highly objectionable.

Felted material is objectionable as it soon becomes soggy and soft when wet, becomes hard and almost liquid-impervious when dry and does not possess sufficient resiliency under use to produce an uninterrupted water effect.

While sponge rubber possesses none of the above mentioned objectionable features, its physical condition is such that its application for the described purposes presents difficulties which have mitigated against its use.

I have found, however, that advantage may be taken of all of its valuable characteristics and attributes by combining it with soft rubber.

Sponge rubber alone can not be satisfactorily employed because its extreme compressibility, its friability, its softness and openness of structure will not allow it to be satisfactorily attached over the opening of a container, such as the neck of a bottle.

I have found, however, that a satisfactory effective device of this character can be formed from a soft rubber element contacting with the neck of a container to which is attached a sponge rubber element into which the liquid contents of the container can pass for usage.

The soft rubber has sufficient solidity and resiliency to allow it to be firmly, but removably, attached to the exterior, or interior, of the bottle neck as desired, and the exterior sponge rubber element can be most satisfactorily employed as a moisture applicator.

I can employ either molded sponge rubber or cut sponge rubber in my device and I later show the application of both of these forms.

When sponge rubber is molded, a skin, or thin layer, of smooth liquid-impervious rubber is formed upon all of the surfaces in contact with the mold, and advantage may be taken of this fact by molding the sponge rubber element and removing those portions of this skin through which it is desired to have the flow of the liquid.

The employment of molded sponge rubber has many advantages in my device. If cut sponge rubber is employed, that is sponge rubber having no surface covered by the liquid-impervious skin, it is evident that the liquid will escape through the entire area of the bottle neck thus supplying an excess of liquid. Further, the liquid will be pressed out from all sides of the exposed portion of the device which in many cases will be highly objectionable. Further, it will be impossible to make the applying surface small to allow of the production of a narrow wetted surface.

If, however, molded sponge rubber is employed, any desired area of skin can be removed from the lower portion of the device, thus regulating the flow of liquid from the container; the sides of the exposed sponge rubber may carry the skin, thus preventing the pressure of water therefrom; and only a portion of the skin on the applicator side may be removed, thus controlling the size of the wetting surface, irrespective of the size of the bottle neck or the size of the device itself.

It will thus be seen that my invention presents a liquid pervious device capable of effective attachment to a bottle neck and which overcomes the objectionable features of the present employed devices.

In the accompanying drawing illustrating modified forms of the device of my invention, similar parts are designated by similar numerals.

Figure 1:
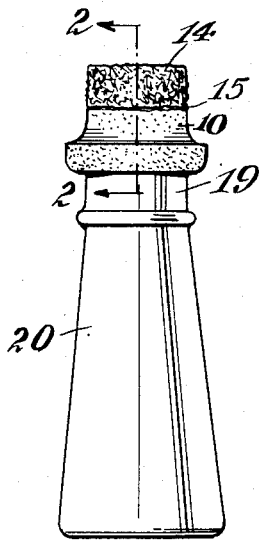
Figure 1 is a side view of one form of the device of my invention.
Figure 2:
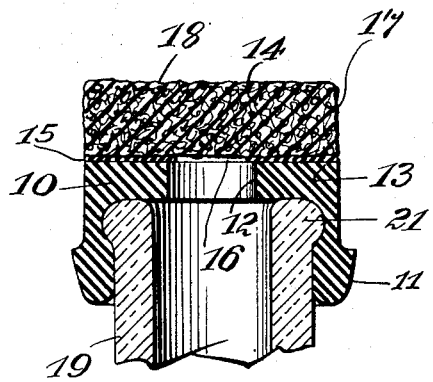
Figure 2 is an enlarged section through the line 2—2 of Figure 1.
Figure 3:
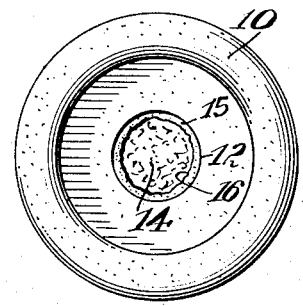
Figure 3 is a bottom view of the device of Figure 1.

The device of my invention shown in Figures 1, 2 and 3 consists of an annular soft rubber base 10, having an enlarged bead 11 and an opening 12 cemented to the upper face of the base member by means of a cementatious material 13, is an annular piece of sponge rubber 14. The lower face of the sponge rubber member 14 is covered by the water-impervious skin 15, formed during the production of the sponge rubber, having a portion 16 from which said skin has been removed.

The side 17 and the top 18 of the member 14 have no water-impervious skin, the exposed surfaces consisting of the porous sponge rubber. When the closure of my invention is applied to the neck 19 of a bottle 20, the bead 11 is positioned below the flange 21 of the bottle neck, thus retaining my device in position thereon. If the bottle 20 containing a liquid be inclined, the liquid will pass outwardly through the opening of the rack 19, through the portion 16 of the sponge rubber member from which the water-imperious skin has been removed and into the sponge rubber applicator 14. If the device be now pressed upon and moved over a surface, some of the water within the pores of the member 14 will be pressed outwardly for moistening purposes.

Figure 4:
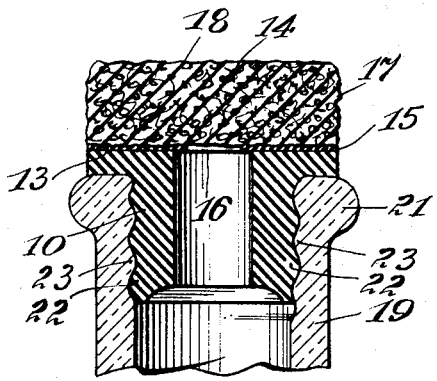
Figure 4 is a vertical sectional view of a modified form of my device.

In the modified form of my device shown in Figure 4, the soft rubber member 10 has a thread 22 formed upon the outer surface of its dependent portion capable of meshment with a corresponding thread 23 formed upon the inner surface of the bottle neck 19.

Figure 5:
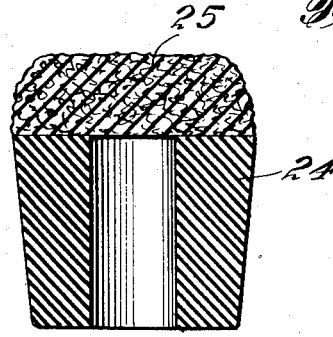
Figure 5 is a vertical sectional view of a modified form of my device.

The modified form of my device shown in Figure 5 consists of a soft rubber stopper member 24 to which is cemented an annular sponge rubber member 25, the skin of which has been removed from the top, bottom and side. This form of my device can be employed by inserting it within the neck of a bottle.

Figure 6:
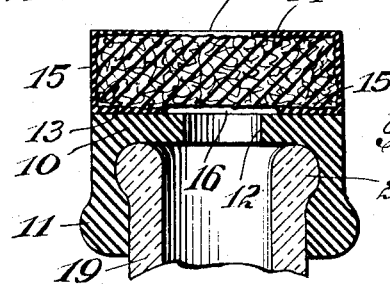
Figure 6 is a vertical sectional view of a modified form of my device.

The modification of my device shown in Figure 6 is similar to that shown in Figure 2, except that the water-impervious skin 15 extends over the outer face of the side and a portion of the top face 18 of the member 14 as well as over the lower face thereof, the lower face having a central portion removed to allow the water to pass from the bottle into the sponge rubber member. By thus constructing the liquid escaping area of the upper face of the sponge rubber member 14, a narrow wetted surface can be produced irrespective of the size of the bottle neck opening and the size of the member 14.

The device of my invention consisting of a soft rubber base capable of removable attachment to a bottle and a sponge rubber applicator member attached thereto possesses many valuable features not incident to other devices suggested for the uses to which my device is applicable.

I do not limit myself to the particular size, shape, number or arrangement of parts specifically shown and described as these are given solely for the purpose of clearly describing my invention.

What I claim is:—

1. In a liquid-pervious attachment for containers, in combination, a soft-rubber tubular member adapted to be removably attached around the neck of a container, an inwardly extended shoulder carried by said tubular member adapted to abut upon the upper face of the neck of a container around which said tubular member is removably attached and a sponge-rubber member attached to said tubular member externally of said container neck and across the opening in said tubular member.

2. In a liquid-pervious attachment for containers, in combination, a liquid-impervious tubular member adapted to be removably attached around the neck of a container, an inwardly extended shoulder carried by said tubular member adapted to abut upon the upper face of the neck of a container around which said tubular member is removably attached and a molded sponge-rubber member attached to said tubular member neck externally of said container neck and across the opening in said tubular member said sponge-rubber member having its liquid-impervious skin upon only a portion of its exposed surface.

3. In a liquid-pervious attachment for containers, in combination, a soft-rubber tubular member adapted to be removably attached around the neck of a container, an inwardly extended shoulder carried by said tubular member adapted to abut upon the upper face of the neck of a container around which said tubular member is removably attached and a molded sponge-rubber member attached to said tubular member externally of said container neck, and across the opening in said tubular member said sponge-rubber member having its liquid-pervious skin upon only a portion of its exposed surface.

4. In a liquid-pervious attachment for containers, in combination, a liquid-impervious tubular member adapted to be removably attached around the neck of a container, an inwardly extended shoulder carried by said tubular member adapted to abut upon the upper face of the neck of a container around which said tubular member is removably attached and a molded sponge-rubber member attached to said tubular member externally of said container neck and across the opening in said tubular member said sponge-rubber member having its liquid-impervious skin upon only a portion of the exposed surface, all of the liquid-pervious portion being in alignment with the opening in said tubular member.

5. In a liquid-pervious attachment for containers, in combination, a soft-rubber tubular member adapted to be removably attached around the neck of a container, an inwardly extended shoulder carried by said tubular member adapted to abut upon the upper face of the neck of a container around which said tubular member is removably attached and a molded sponge-rubber member attached to said tubular member externally of said container neck and across the opening in said tubular member, said sponge-rubber member having its liquid-impervious skin upon only a portion of its exposed surface, all of the liquid-pervious portion being in alignment with the opening in said tubular member.

WILLIAM H. ROSE.